US008839408B1

(12) United States Patent  (10) Patent No.: US 8,839,408 B1
McKinnon et al.  (45) Date of Patent: Sep. 16, 2014

(54) INTEGRATION OF CLOUD MANAGEMENT SYSTEMS WITH ON-PREMISE SYSTEMS

(75) Inventors: Todd McKinnon, San Francisco, CA (US); Kristoffer J. Grandy, San Carlos, CA (US)

(73) Assignee: Okta, Inc., San Francisco, CA (US)

( * ) Notice: Subject to any disclaimer, the term of this patent is extended or adjusted under 35 U.S.C. 154(b) by 831 days.

(21) Appl. No.: 12/943,842

(22) Filed: Nov. 10, 2010

(51) Int. Cl.
*H04L 9/32* (2006.01)
*H04L 29/06* (2006.01)
*G06F 9/00* (2006.01)
*G06F 15/16* (2006.01)
*G06F 15/177* (2006.01)
*H04L 12/24* (2006.01)
*H04L 29/08* (2006.01)

(52) U.S. Cl.
CPC ............ *H04L 41/50* (2013.01); *H04L 63/0428* (2013.01); *H04L 67/2838* (2013.01)
USPC ............. 726/14; 709/223; 709/249; 713/153; 713/168

(58) Field of Classification Search
None
See application file for complete search history.

(56) References Cited

U.S. PATENT DOCUMENTS

| 7,735,127 B1 * | 6/2010 | Rive et al. ........................ 726/12 |
| 2006/0248017 A1 * | 11/2006 | Koka et al. ...................... 705/59 |
| 2007/0083425 A1 * | 4/2007 | Cousineau et al. ............. 705/14 |
| 2008/0320572 A1 * | 12/2008 | Connell et al. .................... 726/6 |

* cited by examiner

*Primary Examiner* — Fatoumata Traore
(74) *Attorney, Agent, or Firm* — Fenwick & West LLP

(57) ABSTRACT

A check in communication is received from an agent running inside a firewall via a permitted firewall communication channel. The check in communication is received via the permitted firewall communication channel without modifying a firewall configuration. The check in communication is responding to with an instruction to be performed by the agent running inside the firewall, where the response is via the permitted firewall communication channel.

33 Claims, 15 Drawing Sheets

Okta
Powering your Cloud Area Network

WELCOME | MY APPLICATIONS | SIGN OUT

| | PEOPLE | APPLICATIONS | REPORTS | SETTINGS |

PEOPLE > JOHN SMITH

STATUS: ACTIVE

PERSONAL INFORMATION                EDIT

| FIRST NAME | JOHN |
| LAST NAME | SMITH |

CONTACT INFORMATION                EDIT

| USERNAME | JOHN.SMITH |
| PRIMARY EMAIL | JOHN.SMITH@MYCOMPANY.COM |
| SECONDARY EMAIL | JS@EMAIL.COM |

CLOUD AREA NETWORK APPLICATIONS

[ CANCEL ]  [ REMOVE ACCESS ]

ASSIGN AN EXISTING APPLICATION INSTANCE TO THIS USER
SELECT THE APPLICATION YOU WANT TO ASSIGN TO THIS USER. IT MAY TAKE A FEW MOMENTS BEFORE THE APPLICATION IS READY FOR USE BY THE USER.

○ WEBEX: WEBEX

○ WORKDAY: XACTLY TEST WORKDAY

○ GOTO MEETING: WEB CONFERENCING

○ SUCCESSFACTORS: SUCCESSFACTORS DEMO ENVIRONMENT

○ RINGCENTRAL: OKTA PHONE SYSTEM

— 352

POWERING YOUR CLOUD AREA NETWORK  © 2010 OKTA, INC. | CONTACT US

AN OVERVIEW OF OKTA'S INTEGRATION WITH ACTIVE DIRECTORY

YOU NEED TO INSTALL OKTA'S LIGHTWEIGHT AGENT TO INTEGRATE WITH ACTIVE DIRECTORY

PLEASE REVIEW THE FOLLOWING INSTALLATION REQUIREMENTS AND SETUP TIPS BEFORE YOU BEGIN:

- INSTALL ON WINDOWS XP OR LATER
  YOU NEED ACCESS TO A HOST SERVER (WINDOWS XP OR LATER) WHERE YOU INSTALL THE OKTA ACTIVE DIRECTORY AGENT. YOU DO NOT NEED TO INSTALL THE AGENT ON THE DOMAIN CONTROLLER ITSELF.

- MUST BE A MEMBER OF YOUR ACTIVE DIRECTORY DOMAIN
  THE HOST SERVER MUST BE A MEMBER OF THE SAME WINDOWS DOMAIN THAT YOUR ACTIVE DIRECTORY USERS ARE A MEMBER OF.

- CONSIDER THE AGENT A PART OF YOUR IT INFRASTRUCTURE
  THE HOST SERVER WHERE THE AGENT RESIDES MUST BE ON AT ALL TIMES. IN OTHER WORDS, DON'T INSTALL IT ON YOUR LAPTOP. THE HOST SERVER MUST HAVE A CONTINUOUS CONNECTION TO THE INTERNET SO IT CAN COMMUNICATE WITH OKTA.

- RUN THIS SETUP WIZARD FROM THE HOST SERVER
  WE RECOMMEND RUNNING THIS SETUP WIZARD IN A WEB BROWSER ON THE HOST SERVER WHERE YOU WANT TO INSTALL THE AGENT. OTHERWISE, YOU WILL NEED TO TRANSFER THE AGENT INSTALLER TO THE HOST SERVER, THEN RUN THE INSTALLER.

YOU CAN ACCESS THIS LIST OF REQUIREMENTS LATER DURING THE AGENT INSTALLATION STEP.

HOW DOES THE OKTA ACTIVE DIRECTORY AGENT WORK?

| INTERNET | FIREWALL | CORPORATE NETWORK |
|---|---|---|
| Okta ← AGENT REQUESTS HTTPS | OKTA AGENT (ON WINDOWS SERVER) | USER IMPORT & AUTHENTICATION → AD DOMAIN CONTROLLER |

INTEGRATION OF CLOUD MANAGEMENT SYSTEMS WITH ON-PREMISE SYSTEMS

BACKGROUND OF THE INVENTION

Increasingly, companies are moving away from applications which they run and manage within their own local datacenter to cloud based applications which run in a remote data center managed by a third party. Users access these applications via an Internet browser application (e.g., Mozilla Firefox or Microsoft Internet Explorer). To provide both regular employees with an easy way to access these web-based applications and to enable system administrators to be able to oversee and manage employee access to these web-based application, a number of companies offer portals or interfaces for accessing these web-based applications and/or for managing user accounts associated with the portal and/or the individual web-based applications themselves. Such systems are referred to as cloud management systems.

However, some such systems have installation issues. Many companies use firewalls to protect their computer systems and some software developers may require a client to make changes to their firewall during installation of their product. This is unattractive for a number of reasons. First, modifying a firewall (e.g., to create a "hole") requires specific knowledge and some companies may not have a dedicated system administrator and/or one with the necessary knowledge to make the change. Also, the security of the client's computer systems may be compromised by the changes to the firewall. It would be desirable if installation and subsequent operation of a cloud management system could be implemented without having to make changes to a firewall.

BRIEF DESCRIPTION OF THE DRAWINGS

Various embodiments of the invention are disclosed in the following detailed description and the accompanying drawings.

FIG. 3 is a diagram showing an example of a user interface for a central point of user account creation after a button to assign an application is pressed.

FIG. 8A is a diagram showing an embodiment of an overview message associated with downloading and installing an agent associated with a user accounts database.

DETAILED DESCRIPTION

The invention can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
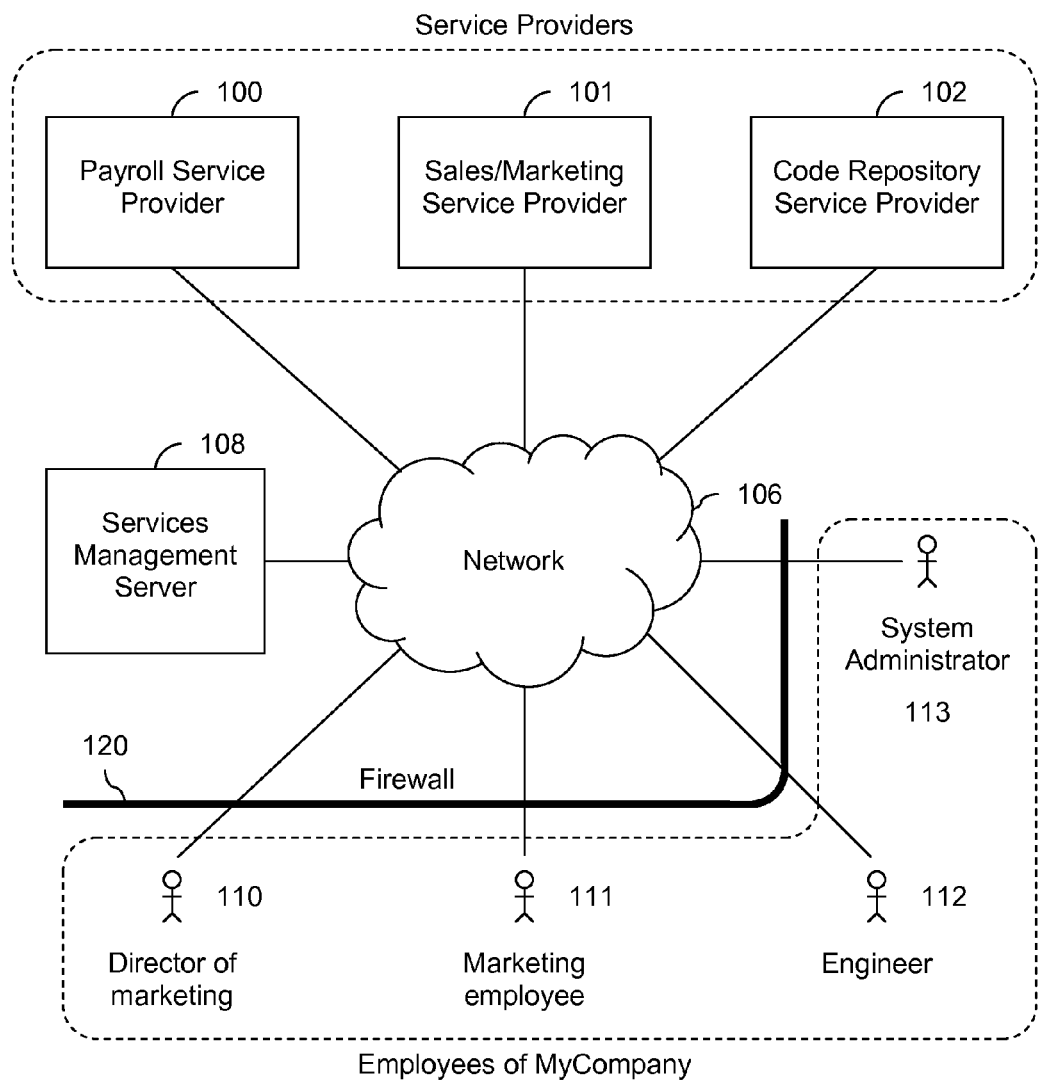
FIG. 1 is a diagram showing an example of a plurality of service providers which provide services to employees of a company.

FIG. 1 is a diagram showing an example of a plurality of service providers which provide services to employees of a company. Examples of services include, without limitation, software and/or related functionality provided to end users as a remotely or other hosted service, e.g., so-called "software as a service" or SAAS. In the example shown, service providers 100-102 provide services to employees 110-113 of MyCompany. MyCompany is sometimes referred to as an (end user) company and employees 110-113 are sometimes referred to as (end) users.

Payroll service provider 100 provides one or more services related to payroll management and all employees of MyCompany have at least some access to its services. Some examples of payroll service providers include ADP and Intuit and some examples of payroll related services including changing a number of (tax) deductions, changing a routing number and account number for automatic deposit, etc.

Sales/marketing service provider 101 provides one or more services to support sales and/or marketing professionals. Some examples of a sales/marketing service provider include Constant Contact (which provides email marketing services) and salesforce.com (which provides services related to sales and collaborations tracking). As marketing professionals, director of marketing 110 and marketing employee 111 have access to and use services provided by sales/marketing service provider 101. Engineer 112 is not a sales or marking professional and therefore in this example does not have access to services provided by sales/marketing service provider 101 (e.g., she does not have a user account at sales/marketing service provider 101). System administrator 113 in some embodiments has access to sales/marketing service provider 101, for example to resolve any technical issues so that employees 110 and 111 can perform their sales or marketing job responsibilities.

Code repository service provider 102 provides one or more services related to code management. For example, a software product or semiconductor product may comprise a plurality of modules or functions developed by a team of engineers and code repository service provider 102 provides one or more services associated with (for example) checking out a module/function, checking in a new version of a module/function, tracking versions of code or when features are added (e.g., in a comments section), tracking the detection and resolution of bugs, etc. Some examples of code repository service providers include Bugzilla and Codesion. In this example, engineer 112 has access to code repository service provider 102 but employees 110 and 111 do not since they are not engineers. In some embodiments, system administrator 113 has access to code repository service provider 102 in order to support engineer 112.

In some embodiments, services provided by one or more of service providers 100-102 are web based services. In such embodiments the services can (for example) be accessed using Internet protocols and/or by accessing a certain website or URL. In some embodiments, one or more of service providers 100-102 include a web server for communicating with services management server 108 via network 106.

Services management server 108 communicates with service providers 100-102 (on behalf of one or more of employees 110-113) to provide one or more canonical features to employees 110-113. (In some embodiments, services management server 108 is a service provider because in addition to managing access to service providers 100-102, services management server 108 provides its own set of services to one or more of employees 110-113). A canonical feature as used herein is an operation or action for which a uniform or consistent interaction or experience is attempted to be provided to an end user across multiple service providers. In some embodiments, a service management server or other mediating node is configured to interact with services providers to make one or more canonical features available to end users across services, including by interacting with service providers in a manner required to cause the service provider to perform actions necessary to provide such canonical features, for example as/when invoked by end users. This uniform or consistent experience by the user is (where possible) independent of the underlying set of services provided by a particular service provider and/or the manner or sequence with which interactions with a particular service provider are performed. One example of a canonical feature is to have a central point of user account creation. Services management server 108 attempts to provide an interface in which a system administrator is able to create user accounts (e.g., for a new employee) for all service providers (e.g., relevant for that new employee) from a central or single point which is independent of the underlying account creation steps or interfaces exposed by or used by the (relevant) service providers. The creation of a user account at each of services 100-102 is presented to or experienced by system administrator 113 in the same way, independent of how each of services 100-102 are interacted with (e.g., in the background) to create a new user. This is in contrast to having to go to different locations (e.g., different websites of the service providers) and having different interactions with the services in order to create a user account. This makes the job of system administrator 113 in FIG. 1 easier, since he can create user accounts for a new employee for any of services 100-102 from a single interface or point rather than accessing each service provider individually and entering the same user information repeatedly.

In some embodiments, a canonical feature relates to or is associated with a user account. Some examples include changing user account permissions or settings, changing a group comprising of one or more user accounts, viewing activity for a user account, etc. In some embodiments, a canonical feature is related to security or authorization. For example, a company may want to have employees set passwords that include a capital letter, a number, and a special character; this policy is enforced as part of a canonical feature independent of any individual requirements services 100-102 might have in some embodiments. In some embodiments, a canonical feature is defined by or is in the context of a particular company. Put another way, canonical features for one company may differ from that of another company (e.g., using services of the same service provider) in some embodiments.

Services management server 108 communicates with payroll service provider 100, sales/marketing service provider 101, and code repository service provider 102 as needed to provide canonical features, some examples of which are described in further detail below. This includes services management server 108 performing any prerequisites, translation, mediation, and/or proxying associated with service providers 100-102 as needed. Without services management server 108, users 110-113 may have to access each service provider directly (e.g., the website of each service provider) and may not have a central interface or point of access from which all services can be accessed.

In various embodiments, a variety of communication devices and/or protocols are employed to manage services as described herein. In some embodiments, users 110-113 use an Internet browser application (e.g., Microsoft Internet Explorer or Mozilla Firefox) running on a variety of devices (e.g., on a computer or a smart phone such as an Apple iPhone or a Motorola Droid) to access a web server associated with services management server 108. The web server associated with services management server 108 in turn communicates with service providers 100-102 and relays information between the end users 110-113 and service providers 100-102. In some embodiments, users 110-113 use a special purpose application running on a smart phone (e.g., an app running on an iPhone) to access canonical features associated with service providers 100-102 via services management server 108.

In this example, firewall 120 limits or otherwise prevents certain interactions between the two sides of the firewall. In some embodiments, certain communications or behaviors (such as an unsolicited request to access a MyCompany server or database behind firewall 120) may be denied. This may make installation or integration of multi-services applications or systems (such as cloud management systems) difficult for system administrator 113 in MyCompany. Some other cloud management system may require changes to firewall 120 in order for their system to work. One example change may be to permit a cloud management server a dedicated/specific "port" or channel via which they can communicate with devices behind the firewall. In essence, this creates a "hole" in firewall 120. This is undesirable for a number of reasons. First, this requires specialized knowledge or skills and a small or mid-sized company may not necessarily have a dedicated IT professional and/or one with the requires knowledge and/or experience to make the change. Second, making the change may be a deviation from a universal and/or commonly employed security policy (which is undesirable) and/or permitting the change creates a "slippery slope" of allowing security exceptions. What is described herein is a technique by which services management server 108 is able to communicate with devices behind firewall 120 without making any changes to firewall 120.

Figure 2:
FIG. 2 is a diagram showing an example of a user interface for a central point of user account creation.

FIG. 2 is a diagram showing an example of a user interface for a central point of user account creation. In the example shown, user interface 300 shows information for an employee, John Smith. In window 304, existing user accounts which have already been created for John Smith are shown. To create a new account for John Smith with another service provider, button 302 is pressed. In some embodiments, user interface 300 is presented to a system administrator (e.g., system administrator 113 in FIG. 1) and one or more user accounts for one of employees 110-112 is created. The next figure shows user interface 300 after button 302 is pressed.

FIG. 3 is a diagram showing an example of a user interface for a central point of user account creation after a button to assign an application is pressed. In the example shown, assign application button 302 in FIG. 2 has been pressed and user interface 350 is displayed in response.

In 352, a user (e.g., a system administrator) selects one of five applications to be assigned to the user and in response to the selection a new user account is created with the appropriate service provider (not shown). In some embodiments, multiple applications are able to be assigned to a user account simultaneously if desired (e.g., more than one radio button in 352 can be selected). The specific interfaces, required fields, and/or underlying processing associated with creating a new user account at each of the service providers (i.e., WebEx, Workday, GoTo Meeting, SuccessFactors, and Ring Central) may vary from service provider to service provider and a services management server (e.g., 108 in FIG. 1) communicates with each service provider as needed on behalf of the user (e.g., system administrator 113 in FIG. 1) to create a user account if so requested. This enables a system administrator or other user to perform a certain action (in this case, create a user account) in a uniform and/or consistent manner independent of the service provider and any underlying processing or interfaces. A service provider can change from one interface or underlying process to another without a user (e.g., a system administrator) being aware of it and/or having to interact directly with the new interface or underlying process.

In some embodiments, a services management server has accessed information associated with John Smith (e.g., prior to generating and displaying interface 350) and the applications or services presented in 352 are selected based on John Smith's job requirements, as described in the retrieved information.

Figure 4:
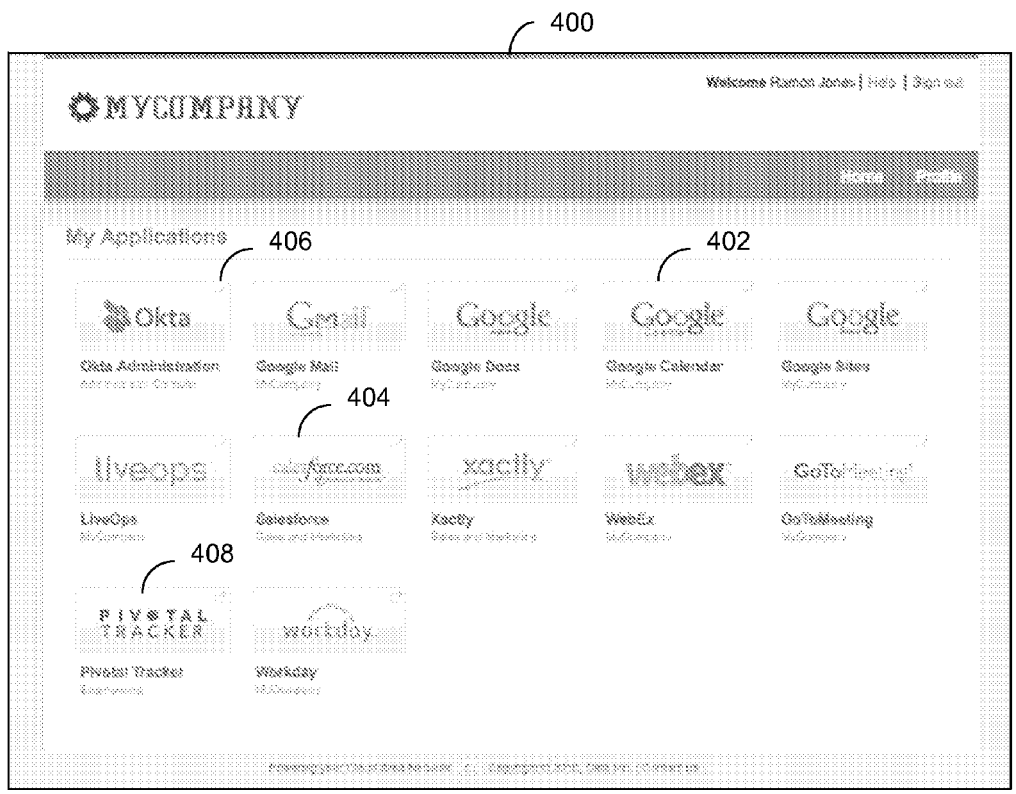
FIG. 4 is a diagram showing an example of a user interface associated with a single portal via which services are accessed.

FIG. 4 is a diagram showing an example of a user interface associated with a single portal via which services are accessed. In this example, a user (Ramon Jones) is presented with the (e.g., web-based) services to which he has access. From interface 400, Ramon can select a service (e.g., Google Calendar 402) and access functions or actions provided by that service provider (e.g., view appointments and create new appointments). In some embodiments, Ramon enters his username and password once (e.g., prior to being presenting interface 400) and subsequent entry of a user name or password (e.g., in order to access a particular service or service provider) is not required. For example, Ramon would not need to enter his Google user name and Google password in order to access Google Calendar 406.

In some embodiments, in order to get to interface 400, a user goes to a website or portal associated with a services management service (e.g., www.okta.com). In some embodiments, a user goes to a website or portal associated with or accessible from a company's website or intranet (e.g., www.mycompany.com) in order to access interface 400.

In some embodiments, the services for which a user (e.g., Ramon Jones) has access to may be dictated by that employee's job functionality or job requirements. For example, beneath Salesforce icon 404 is displayed "Sales and Marketing." In some embodiments, all sales and marketing professionals have access to at least some Salesforce services. In some cases, a service is made available to all employees. For example, Google Calendar 402 may be made available to all employees. In some embodiments, prior to generating and presenting interface 400, a services management server accesses stored information associated with Ramon Jones, determines what services Ramon has access to, and presents icons associated with those services to Ramon in interface 400.

In some embodiments, administration icon 406 is presented in user interface 400 to a system administrator. For example, by clicking on icon 406, interfaces 300 and 350 from FIGS. 2 and 3 may be accessible. In some embodiments, administration icon 406 is presented to a non-system administrator. Some examples of administration services available to non-system administrators accessed by clicking on administration icon 406 include (but are not limited to): requesting access to additional services for which the user already has a user account but for which some services are currently limited or restricted, requesting creation of a new user account at a desired service provider (e.g., which a system administrator will review and respond to), changing a password required to access user interface 400, etc.

In some embodiments, the services accessible to a particular user may depend on a position or rank within the company (e.g., defined by inclusion in a group called "Managers" or "Executives"). For example, managers or executives may have access to some service providers or some services for a given service provider that non-managers and non-executives may not. In one example, an employee training service provider provides online training for all employees of a company. However, managers have to do additional training which non-managers are not required to complete. In that example, two employees both have access to the same service provider (e.g., they would both see an icon for the training service provider in user interface 400) but the specific services that are accessible would vary (e.g., after clicking on the icon for the training service provider in user interface 400). In another example, an employee has access to a particular service provider based on their position within a company. For example, a company may provide a car service for executives but does not offer this benefit to non-executives. Access to a reservation system associated with the car service may be restricted to executives in that example and executives would see an icon for a car service in user interface 400 whereas non-executives would not.

Figure 5:
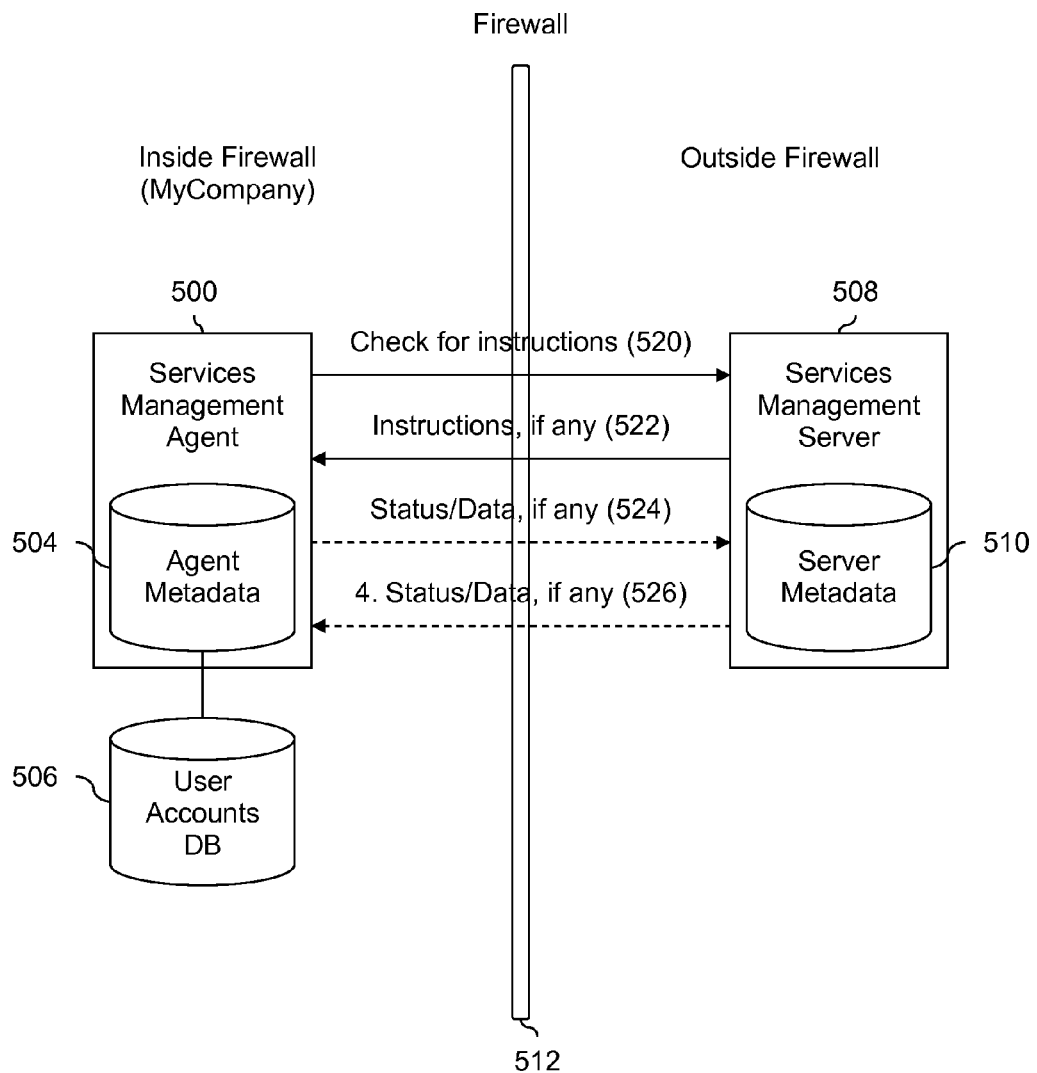
FIG. 5 is a diagram showing an embodiment of communications between a services management agent and a services management server.

FIG. 5 is a diagram showing an embodiment of communications between a services management agent and a services management server. In some embodiments, services management server 108 in FIG. 1 includes services management server 508 described herein. In the example shown, services management agent 500 runs on a device (not shown) inside firewall 512 of MyCompany. In various embodiments, services management agent 500 runs on a variety of servers, processors or devices. In some embodiments, a recommended device on which a services management agent runs is one which takes into account an IT infrastructure. For example, it may be desirable to have a host server on which the agent resides be on at all times. It may not be desirable to install an agent on certain devices (such as laptops) which are occasionally turned off. It may also be desirable to install the agent on a host server which has a continuous connection (e.g., to the Internet, other network or communication channel).

Services management agent 500 stores and manages agent metadata 504. In some embodiments, agent metadata 504 includes a check-in frequency which dictates how frequently services management agent 500 checks in with services management server 508, which is outside of firewall 512. In some embodiments there is a plurality of agents and each agent stores in its metadata a credential which identifies the company associated with the credential (e.g., MyCompany) and which agent (e.g., amongst a plurality associated with MyCompany) the credential is associated with. Such a credential may be included with each check in so that a server knows which company and which agent the check in is coming from.

User accounts database 506 is located inside firewall 512 and stores information associated with user accounts. In some embodiments, user accounts database 506 includes Microsoft's Active Directory. The information managed and stored by user accounts database 506 may be associated with a plurality of applications including (for example) applications associated with service providers 100-102 in FIG. 1, email applications, virtual private network access, etc. For example, in creating an account for engineer 112 with code repository service provider 102, new account information may be added to user accounts database 506. In some embodiments, user accounts database 506 provides a variety of services and/or functions (e.g., which are available to or accessible by services management agent 500 and/or other entities inside firewall 512), including services to de-provision (i.e., delete and/or deactivate) an account, create an account, change a password, change an account property or permission, verify whether a provided user name and provided password match credentials stored in the database, etc. In some embodiments, the communications exchanged between services management agent 500 and services management server 508 are associated with accessing services provided by user accounts database 506 and/or information stored in user accounts database 506.

Services management server 508 includes server metadata 510. In some embodiments, server metadata 510 is used to store metadata associated with services management agent 500 and/or any number of other agents (not shown) with which services management server 508 communicates with. At each check in (520), services management agent 500 sends or otherwise initiates a communication to services management server 508 which checks for instructions. In some embodiments, server metadata 510 stores metadata associated with an instruction. In one specific example, the instruction is associated with synchronizing user accounts database 506 and server metadata 510 includes a synchronization frequency associated with how often to check for new information (e.g., new accounts, de-provisioned accounts or changed accounts) in user accounts database 506 and/or other information associated with user accounts database 506 (e.g., the location of the database, a name of the database, format of the database, etc.).

Services management server 508 determines whether there are any instructions to return to services management agent 500 and if so, what instructions to return (522). If there are not instructions to be executed by services management server 500 then instructions 522 indicate there is nothing to be done (i.e., no instructions). In some embodiments, a decision associated with what instructions, if any, to send to agent 500 is based on server metadata 510. For example, there may be 2 possible instructions, each with its own frequency at which it is performed and this information is stored in server metadata 510. In some embodiments, server metadata 510 includes information for multiple companies (e.g., MyCompany and Acme) and a frequency associated with a given instruction is set to one value for one company and is set to another value for the same instruction for the other company. In some embodiments, an instruction is event driven rather than time driven. For example, a request or query received at services management server 508 from an employee of MyCompany coming from outside the firewall may cause an event-driven instruction to be delivered to the agent on the next check in.

Services management agent 500 responds to the instructions (if any) as appropriate. If there are no instructions for example, there may be no further action. In some embodiments, the instructions cause services management agent 500 to return status and/or data (524) to services management server 508. For example, if the instruction is to synchronize user accounts database 506, then services management agent 500 may send any newly created, newly deleted and/or changed accounts (e.g., changed passwords, changed permissions, etc.) to services management server 508. In some embodiments, there is additional status and/or data (526) sent from services management server 508 to services management agent 500 after that. The specific number of exchanges and/or specific pieces of information exchanged depends upon the specific instruction.

The exemplary system shown permits a variety of instructions to be performed without modification to firewall 512 because the check for instructions 520 sent from services management agent 500 to services management server 508 uses a communication which is commonly permitted to pass through firewall 512 without being blocked by the firewall. For example, the check for instructions may use port 443 associated with the Hypertext Transfer Protocol Secure (HTTPS) protocol. Firewall 512 is configure to permit web queries and communications (including, for example, by permitting services management server 508 to respond to the request from services management agent 500 which permits instructions to be sent from the services management server 508 to services management agent 500, This response to a request originating from services management agent 500 inside firewall 514 is permitted by firewall 512 and thus permits instructions to be received at services management agent 500 from services management server 508 without requiring any changes to firewall 512. Other services management servers which use other techniques may require changes to firewall 512 which may be insecure and/or inconvenient.

As described above, in some embodiments, server metadata 510 stores information associated with a plurality of services management agents 500 and services management server 508 communicates with a plurality of agents. Similarly, in some embodiments there is a plurality of services management servers, each of which communicates with and manages a different set of services management agents. In some embodiments, a system begins with one services management server and gradually adds additional servers as more agents are added and the capacity of existing server(s) is reached. In some embodiments, agent metadata includes information identifying which services management server to check in with (e.g., in the form of an IP address, location or unique identifier) so that each agent knows which server to communicate with. In some embodiments, this can be changed if desired. For example, this may be changed temporarily to bring down a service management server for a short time for maintenance or servicing. In another example it is changed on a more permanent basis, for example to upgrade an older/slower device to a newer/faster one.

In some embodiments, services management agent 500 and/or agent metadata 504 are "lightweight". For example, agent 504 metadata may include only that information necessary to check in with services management server (e.g., check-in frequency; a location, address or identifier associated with services management server 508; any credentials required by services management server; etc.) and/or services management agent 500 may include a set of execution instructions to perform any received instructions. In some embodiments, settings, parameters or other variables associated with instructions are sent by services management server 508 with returned instructions 522 as opposed to being stored locally in agent metadata 504 and populated locally. In some embodiments, a lightweight agent is desirable in case an agent fails. For example, recovery may be easier if most and/or essential information is stored centrally at the server 508 and/or server metadata 510.

Figure 6:
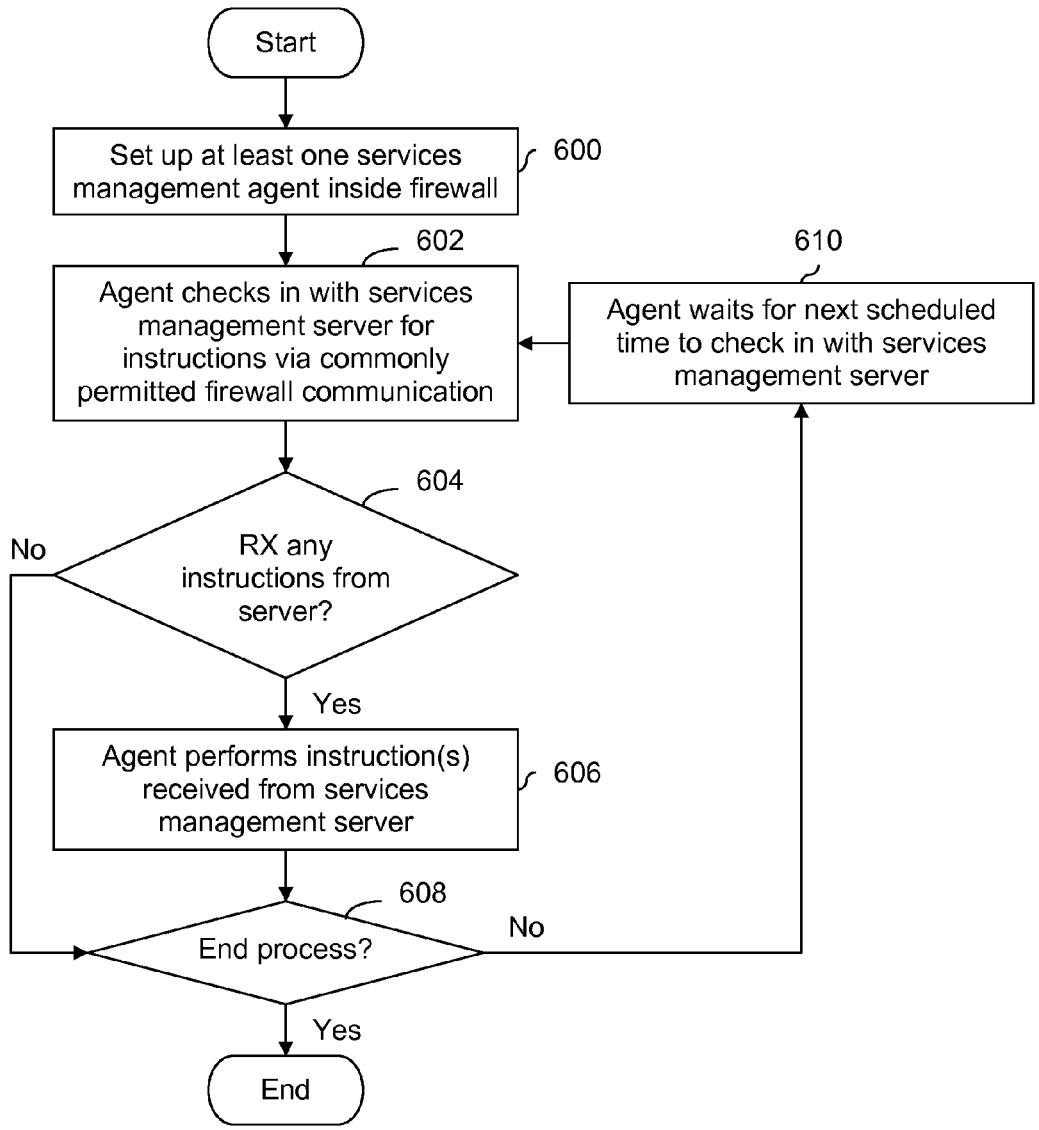
FIG. 6 is a flowchart illustrating an embodiment of a process for setting up and running a services management agent inside a firewall.

FIG. 6 is a flowchart illustrating an embodiment of a process for setting up and running a services management agent inside a firewall. In the example shown, the process is performed inside a firewall, for example inside firewall 512 in FIG. 5. At 600, at least one services management agent is set up inside a firewall. An example of this is described in further detail below. In some embodiments, multiple agents are set up for redundancy/backup reasons. In the event one should fail (e.g., a designated primary agent), another agent is available to take over. In some embodiments, each agent is installed on a separate or independent system so should one system fail it will only bring down one agent. In some embodiments, multiple agents are installed in order to handle more requests, users and/or load.

At 602, an agent checks in with a services management server for instructions via a commonly permitted firewall communication. See, e.g., communication 520 in FIG. 5. In some embodiments, the communication is in the form of a web query (e.g., similar to what would be generated by clicking on a link or other interactive control on a webpage). In some embodiments where there is more than one agent set up, all of the agents check in with the services management server (e.g., periodically). This may be because the server cannot initiate a communication to penetrate a firewall on its own but can gain access by "piggybacking" off a check in communication initiate by an agent; having all agents check in ensures an available check in to piggyback off of even if an agent (e.g., primary agent) fails.

It is determined at 604 if any instructions were received from the server. For example, communication 522 in FIG. 5 in some cases includes an instruction and in other cases includes no instruction. If so, the instruction(s) received from the services management server is/are performed by the agent at 606. Depending upon the particular instruction, this may warrant one or more additional communications between a services management server and agent. In some embodiments where there are multiple agents, a services management server designates one of them to be a primary and the other to be backups. In such embodiments, the server only gives instructions to the primary agent. In some other embodiments, all agents are treated as equal and the next agent to check in after a scheduled time for an instruction or after an event-triggered instruction is given that instruction. In some embodiments, a check in includes a credential identifying which agent the check in is associated with.

If there are no instructions received from a server at 604 or after performing instruction(s) at 606, it is determined whether the process ends at 608. If it is determined not to end the process then the agent waits for a next scheduled time to check in with a services management server at 610.

Figure 7:
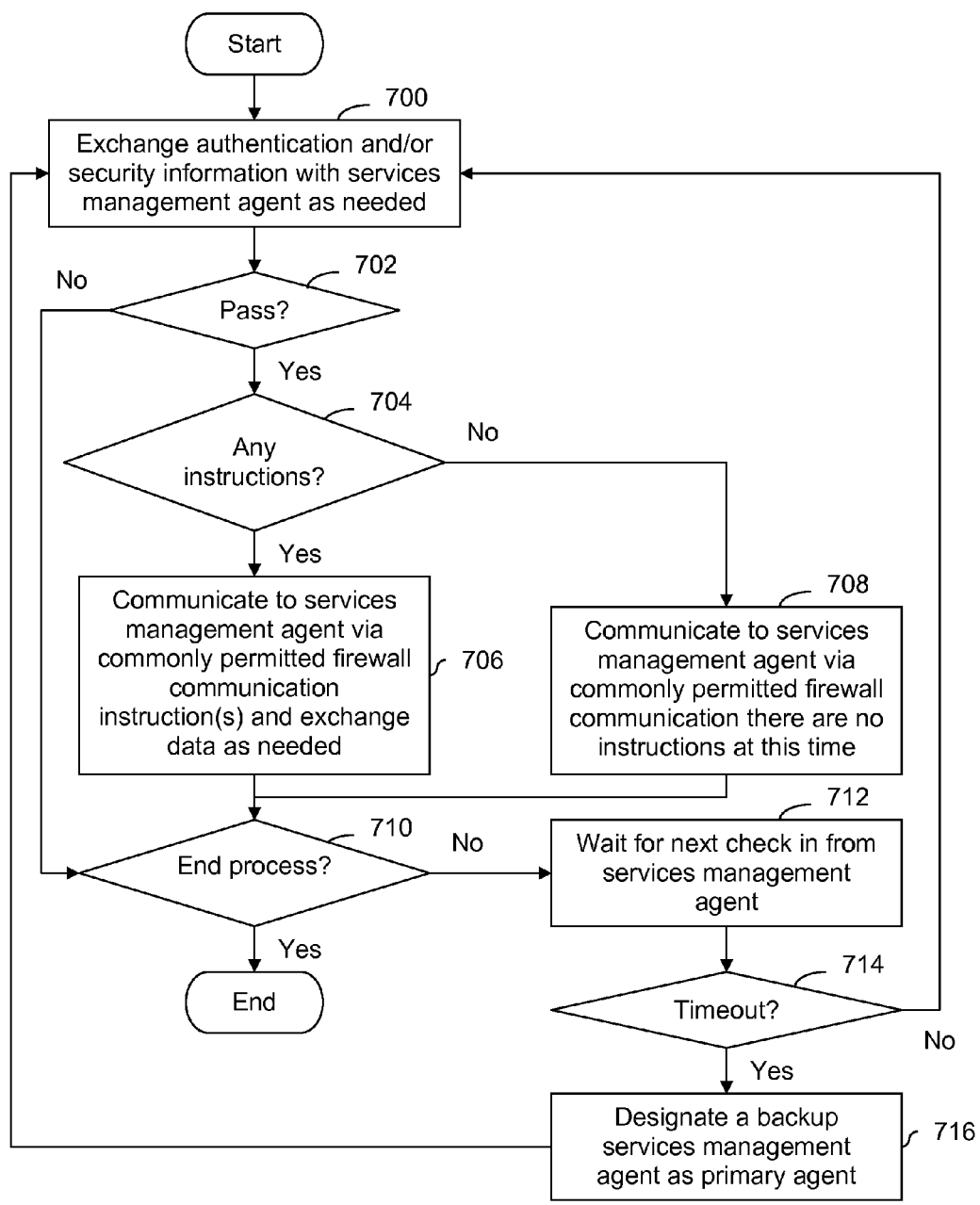
FIG. 7 is a flowchart illustrating an embodiment of a process performed at a services management server outside a firewall.

FIG. 7 is a flowchart illustrating an embodiment of a process performed at a services management server outside a firewall. In some embodiments, services management server 508 in FIG. 5 performs the process shown.

At 700, authentication and/or security information is exchanged with a services management agent as needed. In some embodiments, when an agent first starts up and communicates with a services management server for the first time there is some interaction or steps performed which are not necessarily performed later. Some examples of this are described in further detail below. In some embodiments, an agent stores a credential (e.g., a token generated during the first communication session with a services management server) and this is provided to a services management server in second and later communications sessions.

It is determined at 702 if the exchange passes. For example, a services management server may keep a copy of all valid tokens and may determine if a received token (e.g., included in a check in) matches one in the collection of stored tokens. If it passes, it is determined if there are any instructions at 704. In some embodiments, instructions are scheduled (i.e., time driven events). For example, a check in communication may include some identification of the specific company (e.g., MyCompany) and/or agent (e.g., there may be more than one agent running). Each company may have different frequencies at which to perform a given process or instruction and the services management server may check one or more timers corresponding to that company (these frequencies may be stored in server metadata). In some other embodiments, instructions are event driven (e.g., triggered by some condition being satisfied). In this example, only one agent will receive instructions and a decision at 704 includes determining if the inquiring agent is a designated primary agent (as opposed to a backup). In some other embodiments where all agents are given instructions, this check is not necessarily performed.

If there are scheduled instructions at 704 then instruction(s) is/are communicated to a services management agent via a commonly permitted firewall communication and data is exchanged as needed at 706. For example, some instructions (e.g., to change a setting or permission) may not require any further exchange. In some embodiments, the communication is associated with or directed to port 443 so that a firewall perceives the exchange to be a response to a web query (e.g., similar to one initiated by a person inside the firewall interacting with a webpage). If there are no scheduled instructions at 704 then it is communicated to a services management agent via a commonly permitted firewall communication that there are no instructions at this time at 708.

After communicating as appropriate at 706 or 708 or if an authentication and/or security exchange did not pass at 702, it is determined whether to end a process at 710. If not, there is a wait for a next check in from a services management agent at 712 and it is determined at 714 if there is at timeout. Each time a check in communication is received from the primary agent, the timeout is reset or cleared. In the embodiment described herein there is a plurality of agents running inside a firewall but only one of them is designated to be a primary one. Instructions are only given in this embodiment to the primary agent; the other agents are designated to be backup agents and are not given instructions unless the primary agent fails. In one example of a timeout, if the check-in frequency is 5 seconds and 10 seconds have elapsed since the primary agent last checked in, a timeout is declared.

If a timeout occurs, a backup services management agent is designated as a primary agent 716. In some embodiments, a next agent to check in after a timeout may be declared the primary one. In some embodiments, a next primary agent is pre-selected and a services management server waits for that specific agent to check in before designating it as the primary one. In some embodiments, a services management server keeps track of which agent is primary by storing tokens which are assigned to each agent in the server metadata and recording which one is the primary agent. In some embodiments, designating another agent as primary at 716 includes notifying a system administrator (e.g., at MyCompany) that an agent has failed so that the system administrator can rectify the problem. Some examples of this notification are described in further detail below.

After designating a backup agent as a primary one at 716 or if there is no timeout at 714, authentication and/or security information is exchanged as needed at 700.

The following figures show some exemplary user interfaces associated with setting up a services management agent inside of a firewall. In some embodiments, the user interfaces are presented to a system administrator (e.g., 113 in FIG. 1) and the system administrator provides the requested information and interacts with the setup interface(s) as needed. In some embodiments, setup at 600 in FIG. 6 includes progressing through the following user interfaces.

FIG. 8A is a diagram showing an embodiment of an overview message associated with downloading and installing an agent associated with a user accounts database. In some embodiments, installation overview 850 is presented to a system administrator (e.g., prior to installation) so that the system administrator understands any steps or pre-requirements that must be completed prior to installing and/or running the agent for the first time, or so that the system administrator is comfortable with the installation process. In this example, installation overview 850 includes information associated with operating system requirements (in this example, Windows XP or later but in other embodiments an agent may be able to operate on other operating systems such as LINUX or UNIX), Active Directory domain requirements, suggested devices on which to install the agent and why and suggested devices on which to run a setup wizard. Installation overview 850 also includes a diagram showing the agent in the context of a firewall, outside network (i.e., Internet) and internal network (i.e., Corporate Network).

Figure 8B:
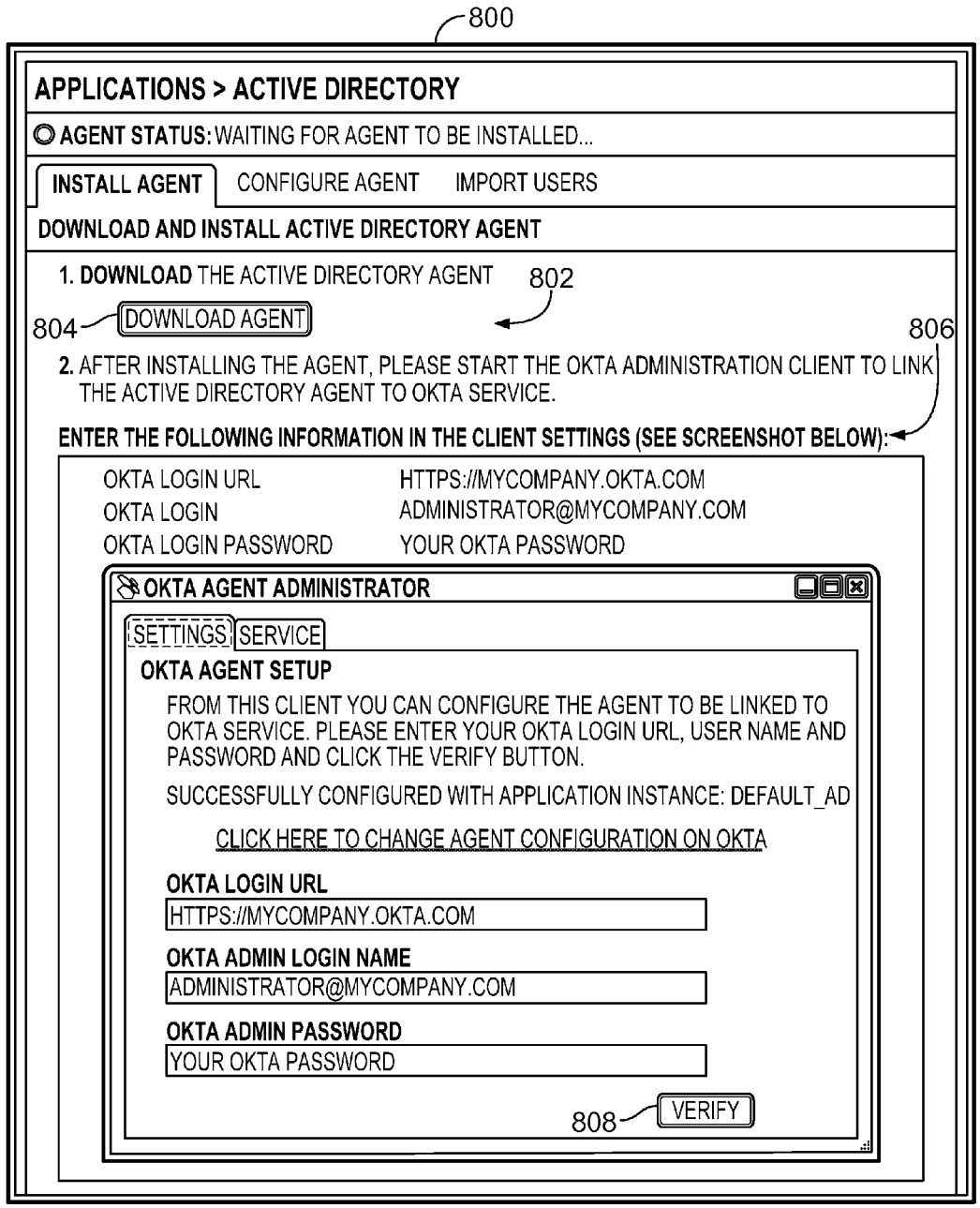
FIG. 8B is a diagram showing an embodiment of an interface for downloading and installing an agent associated with a user accounts database.

FIG. 8B is a diagram showing an embodiment of an interface for downloading and installing an agent associated with a user accounts database. In the example shown, the user accounts database is Microsoft's Active Directory and the agent is associated with synchronizing with Active Directory. Interface 100 includes step 802 of downloading the Active Directory agent. In various embodiments, pressing download button 804 causes an installation executable to be downloaded. Once downloaded, installed and initiated as needed, a setting window is brought up. The exemplary agent shown is associated with Microsoft's Active Directory and therefore the settings shown are similarly associated with Microsoft's Active Directory. Some other agents (e.g., associated with other databases or application) may include other settings appropriate for that database or that application.

Step 806 includes an example of information to provide in a settings window. In the example shown, the login URL (https://mycompany.okta.com in this example) is associated with a device or destination which is managed by a services management service (e.g., Okta) and which is specific to the particular company (e.g., MyCompany). Another company (e.g., Acme) may have a different login URL (e.g., https://acme.okta.com). The settings window shown herein includes an administrator login name (administrator@mycompany.com in this example) and an associated password (not shown). In some embodiments, the administrator login and password are pre-defined or are otherwise set ahead of time. In one example, the login name may (for all companies) be "administrator" at the domain name of the particular company, and the password is initially a default value based on the company name (e.g., company name plus year such as Acme2010 or MyCompany2010). In some embodiments the username and/or password are not necessarily preset. In a more general example, a system administrator uses a username and password associated with the services management server (e.g., an Okta username and Okta password) but which is (for example) selected by the system administrator (as opposed to being defined or assigned by someone else). This ensures that the agent has been installed by someone with a valid (Okta) account and that the services management server (e.g., Okta server) can trust the agent. When the information has been entered, verify button 808 is pressed.

Figure 8C:
FIG. 8C is a diagram showing an embodiment of an interface associated with configuring an agent.

FIG. 8C is a diagram showing an embodiment of an interface associated with configuring an agent. In the example shown, interface 810 is presented when proper information has been entered into the settings window shown in FIG. 8B and the verify button 808 has been pressed. In some embodiments if the login name and/or password are not properly verified (e.g., one or both do not match an expected value) a warning message may be presented and interface 820 is not presented.

Via interface 820, a system administrator provides information associated with the Active Directory. In this example, the directory naming context, organization unit (if any), Active Directory administrator user name and Active Directory administrator password are obtained. As described above, in some other embodiments some other settings or configurations are obtained.

Pressing save configuration button 822 causes the provided information to be stored at a services management server (e.g., in server metadata 510 in FIG. 5). The provided information is not necessarily kept at the agent (e.g., in agent metadata 504 in FIG. 5). This may keep the footprint of an agent relatively small (which is useful in those embodiments where more than one agent is running at a time) and may be more robust in case the agent or the device it is running on goes down. In some embodiments, pressing save configuration button 822 causes a test process to be performed (e.g., to access the Active Directory using the directory naming context, administrator username and password provided via interface 820). This may prevent any (e.g., typographical)

errors from being saved and enable a quick resolution (e.g., while the system administrator is still around).

Figure 8D:
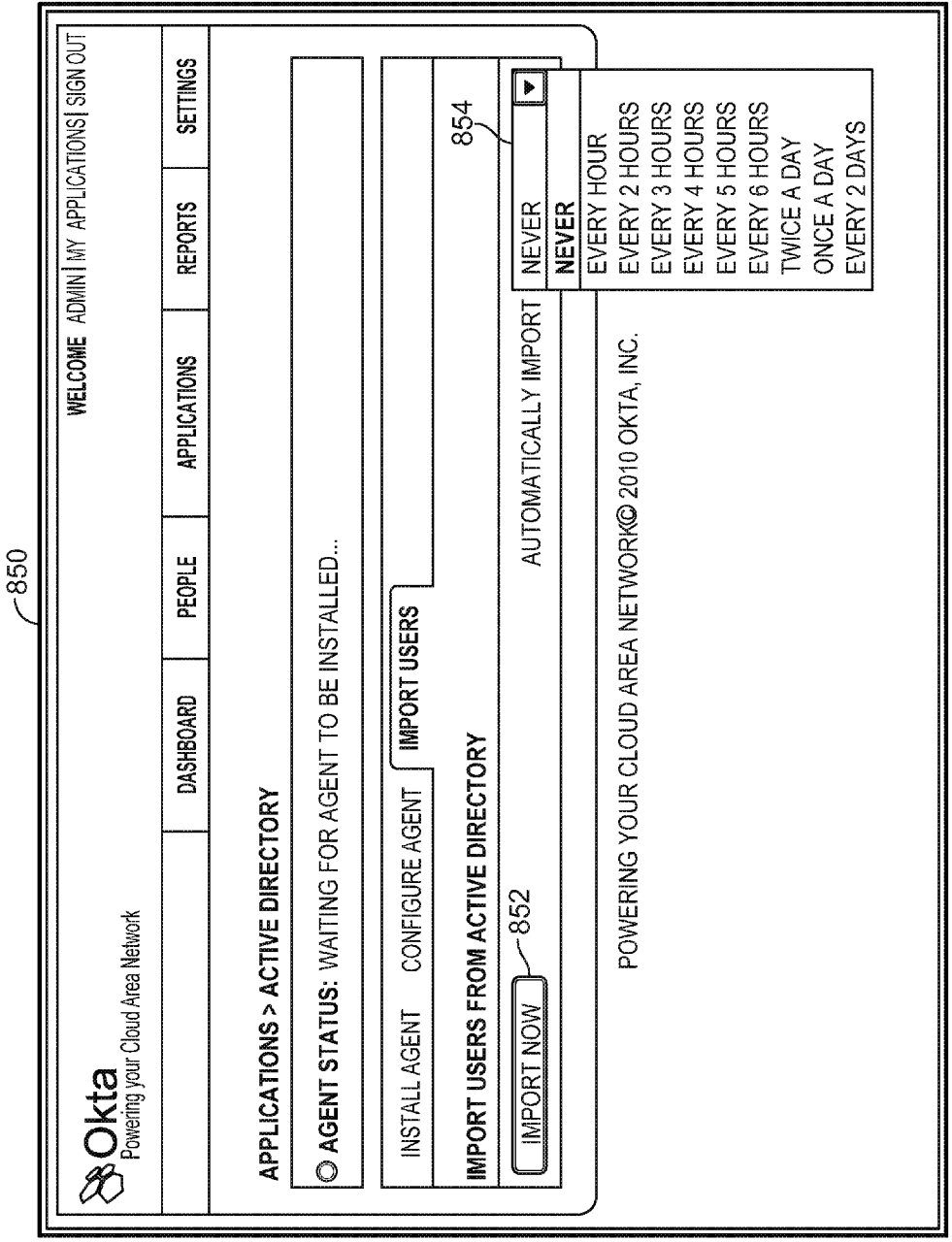
FIG. 8D is a diagram showing an embodiment of a user interface associated with importing users from an Active Directory.

FIG. 8D is a diagram showing an embodiment of a user interface associated with importing users from an Active Directory. In the example shown, interface 850 is presented when save configuration button 822 from FIG. 8C is pressed and resulting checks (if any) have passed.

Pressing import now button 852 causes user account information stored in the MyCompany Active Directory (e.g., user accounts database 506 in FIG. 5) to be imported into a services management server. In some embodiments, the import process includes using the (newly) downloaded agent to communicate with the Active Directory (e.g., 500 and 506, respectively, in FIG. 5) to obtain this information. The directory naming context and Active Directory administrator username and password provided in FIG. 8C may be used to communicate with the Active Directory and the organization unit (if provided) in FIG. 8C may specify which organizational units to import/synchronize (i.e., what user accounts to obtain information for).

Without this import process, a services management server may not be able to provide some of the services and/or functionality described above. For example, without importing information for an administrator via these interfaces, interfaces 300 and 350 (and their underlying services) shown in FIGS. 2 and 3 may not be able to be presented to an administrator. Similarly, if account information for Ramon Jones is not imported, a services management server may not be able to provide the interface and underlying services associated with interface 400 shown in FIG. 4.

Interface 850 also includes a pull down 854. Via pull down 854, a synchronization frequency is set. In some embodiments, this frequency is stored at a server (e.g., in server metadata 510 in FIG. 5) and is associated with the related company (e.g., MyCompany) since different companies may (if desired) set this setting to different values. At the specified interval, a services management server will send out an instruction to synchronize (e.g., import any changes since the last synchronization) information contained in an Active Directory. This will enable newly created user accounts, newly de-provisioned user accounts and newly changed (e.g., permissions or other settings) to be updated at the services management server. This value may be set as desired depending upon the company's wishes. For example, some companies may set up user accounts the day before a new employee shows up and the frequency is set to once a day. This will still enable a new employee to access those interfaces (appropriate for their job functionality and/or as controlled by settings or metadata associated with that user) shown in FIGS. 2-4. Some other companies may create user accounts on the fly and the frequency set using pull down 854 may be set to a higher frequency (e.g., every 5 minutes). This may enable a user to be able to access an interface (e.g., shown in FIGS. 2-4) or a service/application (e.g., 402-408 in FIG. 4) provided via such an interface soon after a system administrator creates an account for them. It may be undesirable (for example) for an employee to be "down" for more than a few minutes.

Figure 8E:
FIG. 8E is a diagram showing an embodiment of a user interface associated with results after users have been imported.

FIG. 8E is a diagram showing an embodiment of a user interface associated with results after users have been imported. In the example shown, import now button 852 in FIG. 8D has been pressed and the results of the importation process are shown in interface 870.

User interface shows how many users have been imported from Active Directory (872), how many users could not be matched (874), how many users have a fuzzy match (876) and how many users have an exact match (878). In some embodiments, a username associated with a services management server (e.g., an Okta server) is required to be an email address (e.g, the work email address of an employee) and an exact match is defined to be or otherwise occurs when the (e.g., work) email address from matches the username known to the services management server. In some embodiments, a fuzzy match occurs when the username known to a services management server doesn't match a work email address but the first and last name match.

Window 880 displays information associated with those users for whom there was no match. The name (e.g., Jason Hindberg), as well as the username and email (e.g., jason.hindberg@mycompany.com) are shown for each user who did not have a match. A system administrator has the option of assigning a person to a new okta account (the values of which are shown in the middle column of window 880, person assigned in Okta (none)), manually entering the name or email associated with an existing Okta account to which that person should be matched to or not importing that person. For example, naming rules may be looking for some combination of the first name or last name and non-standard user accounts may not map to any Okta account even thought there is a corresponding one already created. For example, suppose a person named Robert Smith goes by a nickname (e.g., Bobby) or a middle name (e.g., Thomas). The username or email "bobby smith@mycompany.com" or "thomas.smith@mycompany.com" will not necessarily map to "robert.smith" in some embodiments even though a "robert.smith" Okta account already exists.

Although not shown in this example, window 880 in some embodiments shows information associated with those users (if any) with fuzzy matches). For example, the matches found may be shown and a user has the option of accepting the proposed match, manually changing the match (e.g., by providing a name or email of an existing Otka account), creating a new Okta account or not importing the person.

Once the user has set the assignment options to the desired values (right column of window 880), confirm selected assignments button 882 is pressed and the assignment options are accepted and saved.

Figure 9:
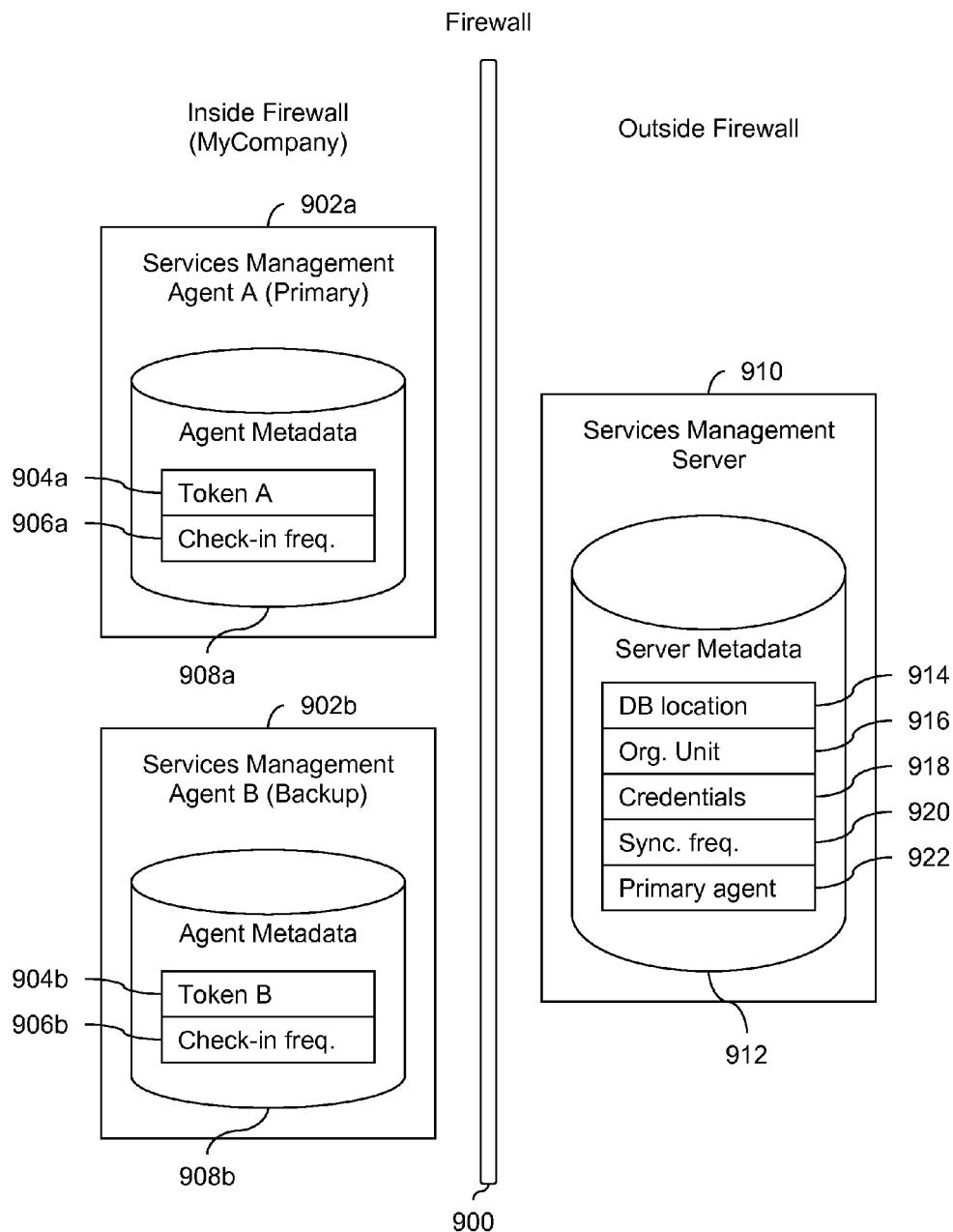
FIG. 9 is a diagram showing an embodiment of metadata stored at a plurality of service management agents inside a firewall and metadata stored at a services management server outside a firewall.

FIG. 9 is a diagram showing an embodiment of metadata stored at a plurality of service management agents inside a firewall and metadata stored at a services management server outside a firewall. In the example shown, the metadata is associated with synchronizing a user accounts database (not shown), such as Microsoft's Active Directory.

In the example shown, agents 902a and 902b run inside firewall 900. In this embodiment, each agent is installed and running on its own (e.g., separate or independent) system or device so that if a system fails only one agent will go down. Each agent stores and manages its own set of metadata: agent metadata 908a and 908b. Each metadata has two fields and corresponding values: a token (904a and 904b) and a check in frequency (906a and 906b). In various embodiments, a token is used by services management server 910 to ensure that requests come from legitimate agents (e.g., as opposed to a hacker or other unauthorized entity) and/or to identify with company and/or agent the check in is associated with. Each agent uses its check in frequency value to time or otherwise determine how frequently to check in with services management sever 910.

In some embodiments, the values of the fields are not necessarily the same in metadata 908a and 908b. For example, the value stored in token 904a is different from the value stored in token 904b since tokens (at least in this embodiment) are used to distinguish one agent from another. A check in communication from agent 902a/902b to services management server 910 may (for example) include the token and from the token the server is able to determine which agent the check in came from. In some cases, the values are the same, for example the values of check frequencies 906a and 906b. Both values may be set to 5 minutes and each agent will check in every 5 minutes with services management server 910. Alternatively, the check in frequency for the backup agent (i.e., field 906b associated with agent 902b) may be set to a different value (e.g., 904a is set to every 5 minutes and 904b is set to every 10 minutes since it is assumed failures by primary agent 902a will occur rarely).

Server metadata 912 includes information associated with MyCompany. In this example only information associated with MyCompany is shown but services management server 910 may communicate with other companies (e.g., Acme) and metadata for those companies may also be stored and managed in metadata 912.

Database location 914 stores location information associated with a user accounts database (not shown), for example information identifying location of the user accounts database within the network of MyCompany and/or a hierarchy or structure of the user accounts database. Organizational unit 916 is associated with identifying which user accounts (e.g., as identified by organizational unit) should be included in any synchronization. In some embodiments, organizational unit 906 is optional and/or a default setting is to synchronize all user accounts.

Credentials 918 in this example is a server assigned credential associated with agents 902a and 902b and includes tokens 904a and 904b. Storing a token in credentials 918 indicates that that token is valid. For example, server 910 may compare tokens stored in credentials 918 against a received token to determine if a check in (which includes a received token) is from a legitimate source and if so, which company and/or agent the check in is associated with. In some embodiments, a server de-authenticates a token by removing it from server metadata 912. When server 910 later checks server metadata 912 for that token it will not find it and an authentication and/or verification process (e.g., steps 700 and 702 in FIG. 7) will fail. This permits the server to control which entities are authorized.

In some embodiments, using server assigned tokens permits the system to operate without having to store usernames and passwords known to a services management server (e.g., of a system administrator or other employees) on agents 902a and 902b. The administrator login name and password shown in FIG. 8B is one example of such information which does not need to be stored on agents 902a and 902b when tokens are used.

Synchronization frequency 920 is associated with a frequency at which a user accounts database is synchronized. In FIG. 8C, for example, this field would be set to 3 hours. If the value of check in frequency 906a is set to every 5 minutes and the synchronization frequency 920 is set to every 3 hours, then agent 901a will check in every 5 minutes but only once every 3 hours will an instruction to synchronize a user accounts database be received.

Primary agent 922 is used to track which agent is the primary agent. In some embodiments, the value is the token of the primary agent (e.g., token 904a in this example since agent 902a is the primary agent). Alternatively, this field and value may be incorporated into credentials 908. For example, there may be a bitmap included in credentials where the bit is set to 0 for all backup agents and the bit is set to 1 for the sole primary agent. In embodiments where there is no designated primary agent (i.e., all agents are given instructions) this field may not necessarily be included in server metadata 912).

In some embodiments, some or all of the information stored in server metadata 912 is not stored in agent metadata 908a and 908b. For example, a synchronize function may be in the form of: sync_fn(<db_location>, <org_unit>). A synchronization instruction may be populated with the appropriate values at server 910 before being sent over to a destination agent for execution.

In some embodiments, services management server 910 may change a field and/or value stored in agent metadata 908a or 908b. For example, in response to a check in request, services management server 910 may include an instruction (to be executed by one or both of agents 902a and 902b) to add a new field and corresponding new value. In another example, services management server 910 instructs one or both of agents 902a and 902b to change a value. For example, agent 902b may be instructed to change its check in frequency (906b) to a new frequency. In some embodiments, an instruction to change a field and/or corresponding value in agent metadata piggybacks off a check in instruction (e.g., is included in instructions 522 in FIG. 5). As described above, agent metadata may be changed as desired by a services management server.

Figure 10:
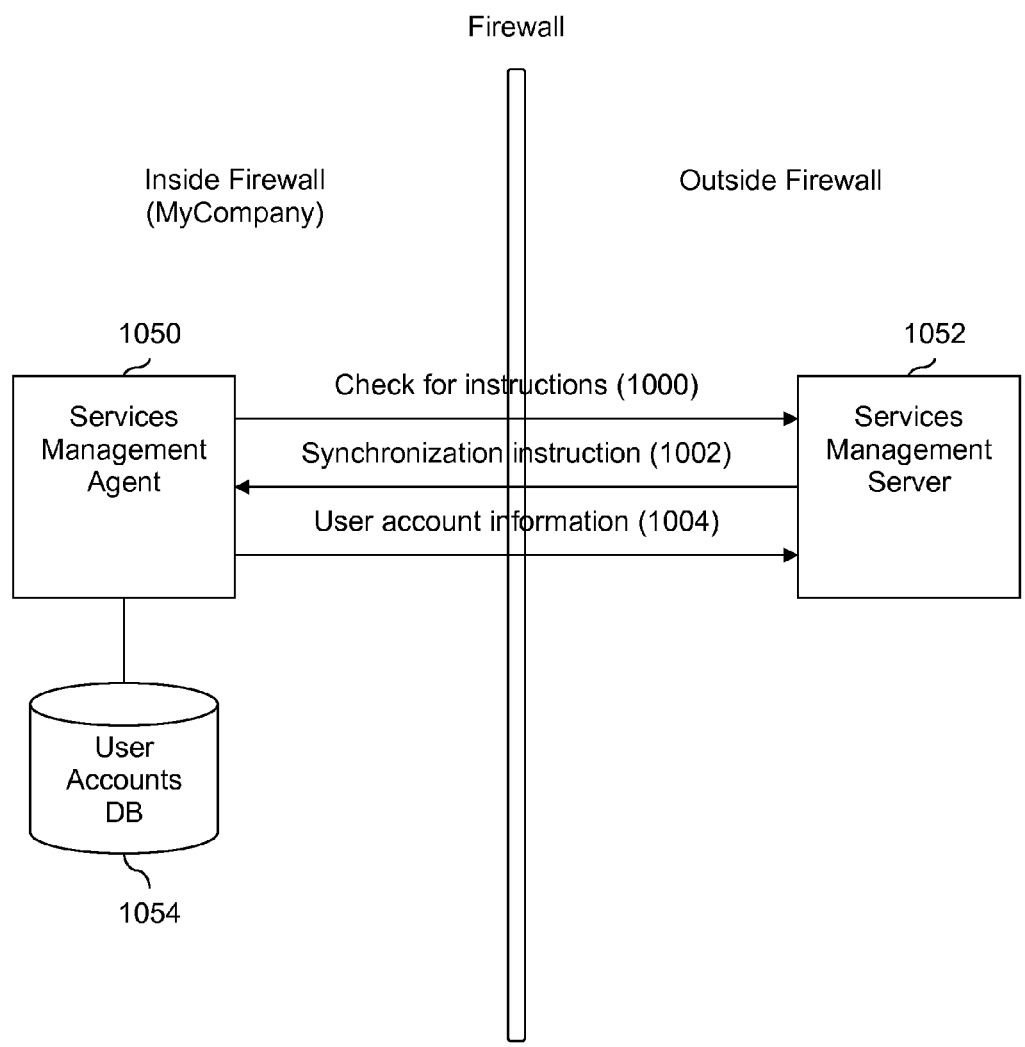
FIG. 10 is a diagram showing an embodiment of a communications between a services management agent and a services management server associated with synchronizing a user accounts database.

FIG. 10 is a diagram showing an embodiment of a communications between a services management agent and a services management server associated with synchronizing a user accounts database.

Services management agent 1050 sends a check for instructions (1102), for example at a time prescribed by a check in frequency stored in agent metadata. A synchronization instruction (1002) is returned from services management server 1052 to services management agent 1050. In some embodiments, the synchronization instruction is an incremental update in that only information associated with newly created, newly de-provisioned or newly changed user accounts (e.g., changed permissions, a change in a defined group or other settings) is exchanged (e.g., where the changes are those that have occurred since a previous or last update). In some embodiments, the synchronization instruction is a full update and information associated with all user accounts stored in user accounts database 1054 is exchanged.

Services management agent 1050 obtains the appropriate user account information from user accounts database 1054 and sends the user account information (1004) to services management server 1052.

Figure 11:
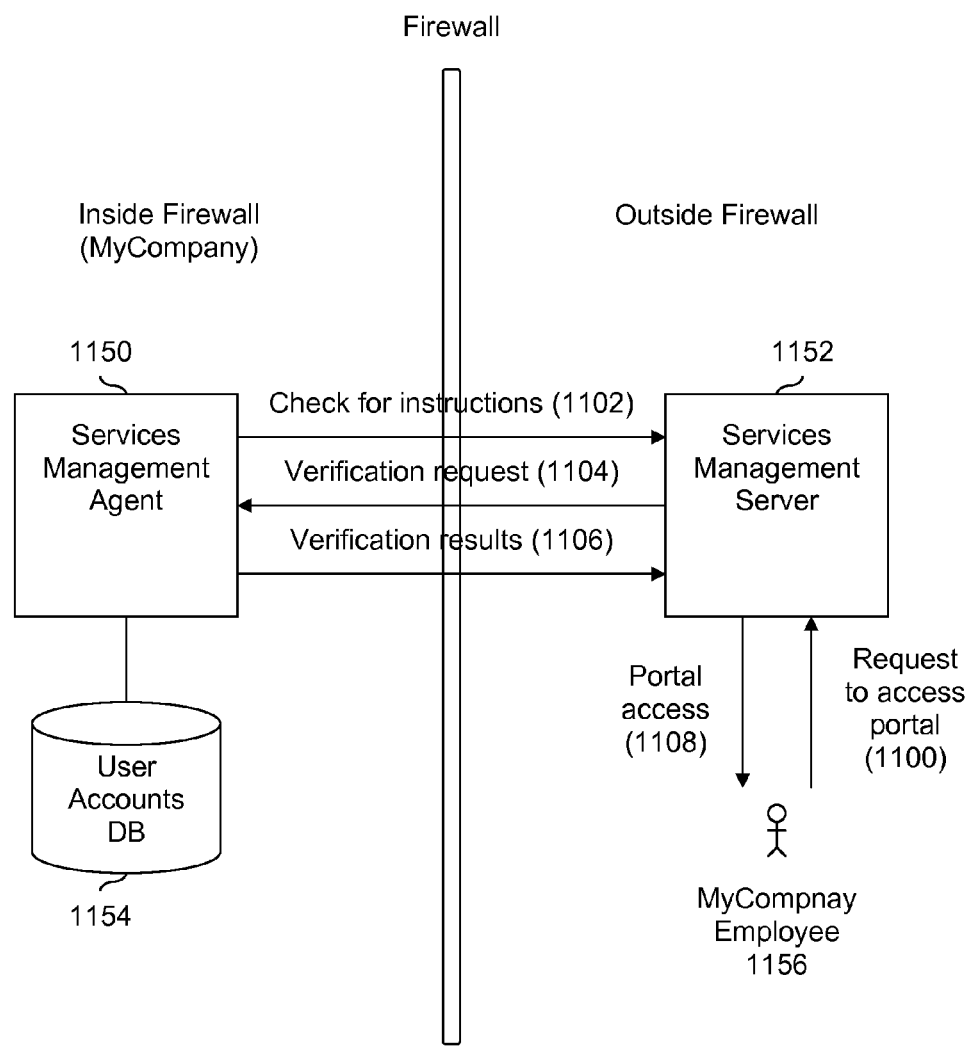
FIG. 11 is a diagram showing an embodiment of communications between a services management agent and a services management server associated with providing access to a portal.

FIG. 11 is a diagram showing an embodiment of communications between a services management agent and a services management server associated with providing access to a portal. In the example shown, employee 1156 is an employee of MyCompany. For example, employee 1156 may be any of employees 110-113 shown in FIG. 1. Employee 1156 is located outside of firewall and requests access to a portal (1100). In various embodiments, employee 1156 provides a variety of information to login in or otherwise authenticate the user to services management server 1152, such as a username, password, certificate and/or smartcard information. In various embodiments, the portal provides access to one or more web-based services or applications and FIGS. 2-4 show some examples of user interfaces employee 1156 is attempting to gain access to. In some embodiments, employee 1156 makes the request via an Internet browser application such as Mozilla Firefox or Microsoft Internet Explorer, for example running on a smart phone, computer, laptop or other device on which an Internet browser application is able to run. In some embodiments, employee 1156 makes request 1000 through a specially designed application, for example running on a smart phone. In some embodiments, employee 1156 makes request 1100 via a URL or webpage (e.g., www.mycompany.okta.com).

At the next check for instructions 1002 sent by services management agent 1150, services management server 1152 will (in response to receiving request 1000) respond with an instruction associated with a verification request (1104). Request 1000 in this example includes a username and password provided by employee 1156 and this information is included in verification request 1104.

Upon receiving the verification request, services management agent 1150 will provide the username and password to user accounts database 1154. Database 1154 will return a verification result, for example "Pass" or "Fail." This verification result is returned by services management agent 1150 to server 1152 in verification results 1106.

If the result is a "Pass" then the services management server 1152 will provide portal access to employee 1156 at 1108. For example, server 1152 will display (or will permit another entity to display) one of the interfaces shown in FIGS. 2-4. If the exchange 1106 indicates a "Fail" then server 1152 may respond in a variety of ways. In some embodiments, a certain number of retries is permitted before employee 1156 is locked out.

From the point of view of employees at MyCompany, the system and communications shown may be useful because they can access services and/or applications even when they are not in the office, inside the firewall. For example, the employee may be able to access user interface 400 shown in FIG. 4 and as a result can access his/her salesforce.com account or other web-based application from outside the firewall (e.g., when working from home, while traveling, etc.).

From the point of view of a system administrator at MyCompany, the system may be attractive because employees can access a portal without having to store username or password information outside of the firewall. Username and password information remains in user accounts database 1154 which is inside the firewall and under the domain and control of the company's security policy. A system administrator may, for example, feel uncomfortable letting username and/or password information be stored on a system managed by another entity (e.g., on services management server 1152).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method performed by a server for communicating with a user accounts database located inside a firewall, wherein the user accounts database stores information associated with one or more user accounts, comprising:
   receiving, from a first agent of two agents that are running inside the firewall, a check in communication via a permitted firewall communication channel, wherein the check in communication is received via the permitted firewall communication channel without modifying a firewall configuration;
   in response to receiving the check in communication:
      determining whether the first agent is a primary agent or a backup agent;
      responsive to determining that the first agent is the backup agent, sending to the first agent an indication that there is no instruction to be performed; and
      responsive to determining that the first agent is the primary agent:
         determining an instruction to be performed by the first agent, wherein performing the instruction causes the first agent to communicate with the user accounts database;
         sending the instruction to the first agent via the permitted firewall communication channel; and
         resetting a timeout associated with the primary agent;
      determining whether the timeout has expired; and
      responsive to determining that the timeout has expired, designating the backup agent to be the primary agent.

2. The method of claim 1, wherein the permitted firewall communication channel includes one or more of the following: a web query or a communication associated with port 443.

3. The method of claim 1, wherein:
   the instruction includes an instruction associated with returning information stored in the user accounts database associated with one or more of the following: any new accounts, any de-provisioned accounts, or any changed accounts; and
   the method further comprises receiving, from the first agent, information stored in the user accounts database associated with one or more of the following: any new accounts, any de-provisioned accounts, or any changed accounts.

4. The method of claim 1, further comprising installing the first agent and configuring one or more settings associated with the first agent, wherein the one or more settings include one or more of the following: a directory naming context, an organizational unit, an Active Directory administrator username, an Active Directory administrator password, or a synchronization frequency.

5. The method of claim 1, further comprising:
   receiving, from the first agent, information associated with one or more user accounts stored in the user accounts database;
   performing an initial import of the received information into the server; and
   displaying information associated with any unmatched users.

6. The method of claim 5, further comprising displaying, for each of the any unmatched users, one or more of the following options: assigning a given unmatched user to a new account at the server, assigning a given unmatched user to an existing and specified account at the server, or not importing the unmatched user.

7. The method of claim 1, further comprising:
   receiving, from the first agent, an administrator username and password;
   verifying the received administrator username and password; and
   responsive to verifying the received administrator username and password;
      returning to the first agent a credential;
      discarding the received administrator username and password; and
      storing the credential.

8. The method of claim 1, further comprising:
   receiving a request, from a user outside the firewall, to access a portal via which a plurality of web-based services is accessible, wherein:
      the received request includes a username and password; and
      the instruction includes an instruction associated with the user accounts database verifying the received username and password; and receiving, from the first agent, verification results generated by the user accounts database.

9. The method of claim 1, further comprising:
receiving a request, from a user outside the firewall, to access a portal via which a plurality of web-based services is accessible, wherein:
the received request includes authentication information including one or more of the following: a certificate or smartcard information; and
the instruction includes an instruction associated with the user accounts database verifying the received authentication information; and
receiving, from the first agent, verification results generated by the user accounts database.

10. The method of claim 1, wherein performing the instruction causes the first agent to manage a user account by modifying information associated with the user account that is stored in the user accounts database.

11. The method of claim 1, wherein performing the instruction causes the first agent to create a new user account by storing information associated with the new user account in the user accounts database.

12. The method of claim 1, wherein performing the instruction causes the first agent to deactivate a user account by modifying information associated with the user account that is stored in the user accounts database.

13. The method of claim 1, wherein performing the instruction causes the first agent to perform delegated authentication using information associated with a user account that is stored in the user accounts database.

14. The method of claim 1, wherein the check in communication is received periodically.

15. A server, comprising:
a processor configured to:
receive, from a first agent of two agents that are running inside a firewall, a check in communication via a permitted firewall communication channel, wherein the check in communication is received via the permitted firewall communication channel without modifying a firewall configuration;
in response to receiving the check in communication:
determine whether the first agent is a primary agent or a backup agent;
responsive to determining that the first agent is the backup agent, send to the first agent an indication that there is no instruction to be performed; and
responsive to determining that the first agent is the primary agent:
determine an instruction to be performed by the first agent, wherein performing the instruction causes the first agent to communicate with a user accounts database located inside the firewall, wherein the user accounts database stores information associated with one or more user accounts;
send the instruction to the first agent via the permitted firewall communication channel; and
reset a timeout associated with the primary agent; and
determine whether the timeout has expired; and
responsive to determining that the timeout has expired, designate the backup agent to be the primary agent; and
a memory coupled to the processor and configured to provide the processor with instructions.

16. The server of claim 15, wherein:
the instruction includes an instruction associated with returning information stored in the user accounts database associated with one or more of the following: any new accounts, any de-provisioned accounts, or any changed accounts; and
the processor is further configured to receive, from the first agent, information stored in the user accounts database associated with one or more of the following: any new accounts, any de-provisioned accounts, or any changed accounts.

17. The server of claim 15, wherein the processor is further configured to:
receive, from the first agent, information associated with one or more user accounts stored in the user accounts database;
perform an initial import of the received information into the server; and
display information associated with any unmatched users.

18. The server of claim 17, wherein the processor is further configured to display, for each of the any unmatched users, one or more of the following options: assigning a given unmatched user to a new account at the server, assigning a given unmatched user to an existing and specified account at the server, or not importing the unmatched user.

19. The server of claim 15, wherein the processor is further configured to:
receive, from the first agent, an administrator username and password;
verify the received administrator username and password; and
responsive to verifying the received administrator username and password;
return to the first agent a credential;
discard the received administrator username and password; and
store the credential.

20. The server of claim 15, wherein the processor is further configured to:
receive a request, from a user outside the firewall, to access a portal via which a plurality of web-based services is accessible, wherein:
the received request includes authentication information; and
the instruction includes an instruction associated with the user accounts database verifying the received authentication information; and
receive, from the first agent, verification results generated by the user accounts database.

21. A computer program product for communicating with a user accounts database located inside a firewall, wherein the user accounts database stores information associated with one or more user accounts, the computer program product being embodied in a non-transitory computer readable storage medium and comprising computer instructions for:
receiving, from a first agent of two agents that are running inside the firewall, a check in communication via a permitted firewall communication channel, wherein the check in communication is received via the permitted firewall communication channel without modifying a firewall configuration;
in response to receiving the check in communication:
determining whether the first agent is a primary agent or a backup agent;
responsive to determining that the first agent is the backup agent, sending to the first agent an indication that there is no instruction to be performed; and responsive to determining that the first agent is the primary agent:
  determining an instruction to be performed by the first agent, wherein performing the instruction causes the first agent to communicate with the user accounts database;
  sending the instruction to the first agent via the permitted firewall communication channel; and
  resetting a timeout associated with the primary agent:
determining whether the timeout has expired; and
responsive to determining that the timeout has expired, designating the backup agent to be the primary agent.

22. The computer program product of claim 21, wherein the permitted firewall communication channel includes one or more of the following: a web query or a communication associated with port 443.

23. The computer program product of claim 21, wherein:
  the instruction includes an instruction associated with returning information stored in the user accounts database associated with one or more of the following: any new accounts, any de-provisioned accounts, or any changed accounts; and
  the computer program product further comprises computer instructions for receiving, from the first agent, information stored in the user accounts database associated with one or more of the following: any new accounts, any de-provisioned accounts, or any changed accounts.

24. The computer program product of claim 21, further comprising computer instructions for installing the first agent and configuring one or more settings associated with the first agent, wherein the one or more settings include one or more of the following: a directory naming context, an organizational unit, an Active Directory administrator username, an Active Directory administrator password, or a synchronization frequency.

25. The computer program product of claim 21, further comprising computer instructions for:
  receiving, from the first agent, information associated with one or more user accounts stored in the user accounts database;
  performing an initial import of the received information into the server; and
  displaying information associated with any unmatched users.

26. The computer program product of claim 25, further comprising computer instructions for displaying, for each of the any unmatched users, one or more of the following options: assigning a given unmatched user to a new account at the server, assigning a given unmatched user to an existing and specified account at the server, or not importing the unmatched user.

27. The computer program product of claim 21, further comprising computer instructions for:
  receiving, from the first agent, an administrator username and password;
  verifying the received administrator username and password; and
  responsive to verifying the received administrator username and password;
    returning to the first agent a credential;
    discarding the received administrator username and password; and
    storing the credential.

28. The computer program product of claim 21, further comprising computer instructions for:
  receiving a request, from a user outside the firewall, to access a portal via which a plurality of web-based services is accessible, wherein:
    the received request includes a username and password; and
    the instruction includes an instruction associated with the user accounts database verifying the received username and password; and
  receiving, from the first agent, verification results generated by the user accounts database.

29. The computer program product of claim 21, further comprising computer instructions for:
  receiving a request, from a user outside the firewall, to access a portal via which a plurality of web-based services is accessible, wherein:
    the received request includes authentication information including one or more of the following: a certificate or smartcard information; and
    the instruction includes an instruction associated with the user accounts database verifying the received authentication information; and
  receiving, from the first agent, verification results generated by the user accounts database.

30. The computer program product of claim 21, wherein performing the instruction causes the first agent to manage a user account by modifying information associated with the user account that is stored in the user accounts database.

31. The computer program product of claim 21, wherein performing the instruction causes the first agent to create a new user account by storing information associated with the new user account in the user accounts database.

32. The computer program product of claim 21, wherein performing the instruction causes the first agent to deactivate a user account by modifying information associated with the user account that is stored in the user accounts database.

33. The computer program product of claim 21, wherein performing the instruction causes the first agent to perform delegated authentication using information associated with a user account that is stored in the user accounts database.

* * * * *